United States Patent
English et al.

[15] 3,669,910

[45] June 13, 1972

[54] MANUFACTURE OF FOAMS

[72] Inventors: Geoffrey English; Brian Arthur Mountfield, both of Manchester, England

[73] Assignee: Imperial Chemical Industries Limited, London, England

[22] Filed: Feb. 22, 1971

[21] Appl. No.: 117,797

Related U.S. Application Data

[63] Continuation-in-part of Ser. No. 732,033, May 27, 1968, abandoned.

[52] U.S. Cl. ............................260/2.5 N, 260/18 N, 260/78 S, 260/857 UN, 260/857 F, 260/857 R
[51] Int. Cl. .................................................C08j 1/18
[58] Field of Search ......................260/2.5 N, 7.5 F

[56] References Cited

UNITED STATES PATENTS

| | | | |
|---|---|---|---|
| 3,017,391 | 1/1962 | Mottus | 260/2.5 N |
| 3,065,189 | 11/1962 | Becke et al. | 260/2.5 N |
| 3,232,892 | 2/1966 | Fisher | 260/2.5 N |
| 3,322,696 | 5/1967 | Fisher et al. | 260/2.5 N |
| 3,376,237 | 4/1968 | Fuller | 260/2.5 N |
| 2,608,536 | 8/1952 | Sterling | 260/2.5 F |
| 3,271,331 | 9/1966 | Ender | 260/2.5 F |
| 3,429,838 | 2/1969 | Hersh | 260/2.5 SI |

*Primary Examiner*—Samuel H. Blech
*Assistant Examiner*—Morton Foelak
*Attorney*—Cushman, Darby & Cushman

[57] ABSTRACT

Manufacture of rigid polyamide foams by producing a foam of molten polyamide in presence of a non-ionic surface active agent, especially an alkylene oxide condensate with an alkanol, alkylamine or alkylphenol containing 10 to 20 carbon atoms, and then cooling below the melting point to solidify the polyamide.

17 Claims, No Drawings

MANUFACTURE OF FOAMS

This application is a continuation-in-part of our copending application, Ser. No. 732,033, filed May 27th 1968, now abandoned.

This invention relates to the manufacture of foamed polyamides. The term polyamide refers to the thermoplastic polymers which are obtained by polycondensation of diamines with dicarboxylic acids, or self-condensation of amino acids or lactams. More particularly it refers to those linear polyamides which have fiber-forming characteristics and are termed "-nylon." Specifically it includes:

| | |
|---|---|
| polyhexamethyleneadipamide | (nylon 6:6) |
| polycaprolactam | (nylon 6) |
| polyundecanolactam | (nylon 11) |
| polydodecanolactam | (nylon 12) |
| polyhexamethylene sebacamide | nylon 6:10) |
| polyhexamethylene isophthalamide | (nylon 6:iP) |
| polyhexamethylene terephthalamide | (nylon 6:T) |
| poly-metaxylylene adipamide | (nylon MXD:6) | and copolymers thereof.

Many foamed plastic materials are known and some, for example polystyrene, are now in widespread use for decorative and insulation purposes. Despite the ready availability of polyamides (nylons) particularly polyhexamethylene adipamide (nylon 6.6) it is remarkable that foams have not been produced commercially from these materials. Difficulties have in fact been encountered in producing satisfactory foamed polyamides because these polymers have crystalline characteristics and therefore undergo a relatively sharp transition from molten to rigid foam. For satisfactory foam production it is necessary not only to produce a fine dispersion of gas bubbles in molten polyamide, but also to preserve this dispersion during the sharp transition to rigid foam.

It is also known to produce polyamide foams from lactams by polymerization in presence of a blowing agent. The use of certain surface active agents in such processes has been described, for example in U.S. Pat. Nos. 3,232,892, 3,376,237 and 3,322,696. The surface active agents used in the known processes for polymerizing and foaming lactams are of the anionic type and do not give satisfactory results when applied to the foaming of polyamides because they exhibit an alkaline reaction which, at the high working temperatures which are necessary, degrades the polyamide unless very brief mixing times are employed.

The present invention relates to the production of foams from polyamides, particularly polyhexamethylene adipamide and polycaprolactam, in the presence of surface active agents which, unlike those used in the known lactam polymerization and foaming processes, do not result in serious degradation of the polymer.

According to the invention a process for the manufacture of rigid polyamide foam comprises producing a foam of molten polyamide in the presence of a non-ionic surface active agent and then cooling below the melting point to solidify the polyamide.

In one embodiment of the invention gas may be forced into the molten polyamide by mechanical means and foaming in the presence of a surface active agent may then be caused to take place by reducing the pressure on the molten polyamide.

According to a preferred feature of the invention a process for the manufacture of rigid polyamide foam comprises maintaining at a temperature above the melting point a mixture comprising a polyamide, a blowing agent and a non-ionic surface active agent, whereby to cause foaming to occur, and then cooling below the melting point to solidify the polyamide.

In the preferred process the polyamide preferably in powder form may be mixed with the blowing agent and surface active agent and subsequently heated above the melting point until foaming occurs. Alternatively the blowing agent can be introduced into an already molten mixture of the polyamide and surface active agent.

Optionally, but not essentially the invention may be carried out in presence of a polymerization catalyst.

Advantageously a cross linking agent for the polyamide may be present.

When a polymerization catalyst or cross linking agent is employed the polyamides used are preferably of low molecular weight, for example 1,000 to 5,000, but otherwise it is advantageous to use polyamides of high molecular weight, for example 10,000 to 40,000.

Particular non-ionic surface active agents which produce advantageous results in the process of the invention are alkylene oxide (e.g., ethylene oxide or propylene oxide) condensates with alkanols, alkylamines or alkylphenols containing for example from 10 to 20 carbon atoms. Condensates containing from 1 to 5 moles of alkylene oxide are preferred. When a depolymerizable polymer, e.g., polymethylmethacrylate is used as the blowing agent block copolymers of alkylene oxides with siloxanes are very effective blowing agents.

Specific examples of non-ionic surface active agents of the preferred types are

Lubrol MOA (Registered Trade Mark—Imperial Chemical Industries Limited)—a condensate of cetyl alcohol with less than 5 moles of ethylene oxide Ethomeen S12 (Registered Trade Mark—Farbenfabriken Bayer)—a condensate of primary amines derived from soya bean fatty acids (chiefly $C_{16}$) with about 2 moles of ethylene oxide Silcocell 380 (Registered Trade Mark—Imperial Chemical Industries Limited)—a siloxane alkylene oxide block copolymer.

The amount of surface active agent employed may be for example from 0.1 to 5 percent (preferably from 1 to 2 percent by weight of the polyamide.

Blowing agents which may be used in the process of the invention are substances which at a temperature above the melting point of the polyamide give rise to gaseous products which expand the molten polyamide into a foam. Examples of such blowing agents are carbonates, bicarbonates, oxamates, azides, hydrazides, azodicarbonamides and semicarbazides. Other blowing agents which may be used are depolymerizable polymers for example polymethacrylates, e.g., polymethylmethacrylate; poly($\alpha$-methylstyrene); polystyrene; polyolefinesulphones, e.g., poly(isopropylene sulhpone) and poly(isobutylene sulphone); aldehyde and ketone polymers, e.g., polyformaldehyde, polyacetaldehyde and polyacetone; and polylactams, e.g., polypyrrolidone. Depolymerizable polymers act as blowing agents when they are heated above the ceiling temperature, that is to say above the temperature at which the rate of depolymerization into monomer equals the rate of polymerization. Preferred depolymerizable polymers which may be used as blowing agents are those of which the monomers recombine to form the polymer on cooling again below the ceiling temperature.

Cross linking agents which may optionally be used in the process of the invention are polyfunctional substances containing groups (not necessarily the same) capable of reacting with the amine of carboxylic acid end groups in the polyamide, or with the amide links in the chain thereof. Such groups are, for example amino, carboxy, carbamato, carbonamido, isocyanato, hydroxy, aldehyde or keto groups, and there may be more than one type of group in the polyfunctional substance. When the said groups in the polyfunctional substance react only with end-groups in the polyamide at least three said groups must be present in the polyfunctional substance. Specific examples of cross linking agents are the bishexamethylenetriamine/adipic acid 2:3 molar complex, and the hydroxyhexamethylenediamine/adipic acid 1:1 molar complex.

Catalysts which may optionally be used in the process of the invention include oxyacids of phosphorus and their salts, for example orthophosphoric acid, hyphosphorous acid and pyrophosphoric acid or organic oxyacids of phosphorus, e.g., cyclohexylphosphonic acid.

By the process of the invention there are obtained rigid foams of good strength which are suitable for use as structural, insulating and decorative materials for example in the building industry. Because the use of non-ionic surface active agents, especially those of the preferred types, minimizes degradation of the polyamide the foams obtained are of greater strength than those obtained by using anionic surface active agents.

The invention is illustrated but not limited by the following examples in which the parts are by weight:

EXAMPLE 1

20 parts of nylon 6.6 (molecular weight 1,450: amine end groups 727 g equivalent per million grams : carboxyl end groups 657 g equivalent per million grams) containing 0.1 mole per cent of cyclohexylphosphonic acid was melted under nitrogen by heating in a vapor bath at 306° C. When it had been molten for 5 minutes 0.35 parts of a condensate of octylphenol with 8 moles of ethylene oxide was mixed into the melt. 4 parts of polymethylmethacrylate was then added, the mixture was stirred for half a minute and heating was continued for 8 minutes, during which time expansion into a foam took place. The mixture was then rapidly cooled by quenching in water. A strong rigid foam was obtained, having a density of 0.36 g/cc.

The following table summarizes the production of other foams by repeating the procedure of Example 1 using cross linking agents in addition to surface active agents.

| Example | Surfaces active agent | Cross linking agent | Polymer Density (g/cc) |
|---|---|---|---|
| 2 | Octylphenol/8 moles ethylene oxide (0.35 parts) | bishexamethylene-triamine adipic acid 2:3 molar complex (2 parts) | 0.34 |
| 3 | Silcocell 380 (0.4 parts) | do | 0.27 |
| 4 | Octylphenol/8 moles ethylene oxide (0.35 parts) | hydroxyhexamethylene diamine adipic acid 1:1 molar complex (1:1 parts) | 0.17 |
| 5 | Silcocell 380 (0.4 part) | do | 0.24 |

EXAMPLE 6

24 Parts of nylon 6.6 powder (molecular weight 15,000), 6 parts of Acrylic Granules DA 100 (a brand of polymethylmethacrylate manufactured by Imperial Chemical Industries Limited) and 0.5 part of Silcocell 380 were melted together under nitrogen by heating in a vapor bath at 280° C. When molten, the mixture was stirred for 2 minutes, the stirrer was removed and the polymer was allowed to foam. After 10 minutes heating was stopped and the foam was allowed to solidify. A tough rigid foam of density 0.2 g/cc was obtained.

EXAMPLE 7

25 Parts of nylon 6.6 granules (molecular weight 15,000) and 0.5 parts of Lubrol MOA were placed under nitrogen in a long glass tube equipped with a stainless steel helical agitator fitting closely in the tubes, and melted by heating in a vapor bath at 280° C. On starting agitation the helix of the stirrer forced small bubbles of gas into the polymer melt and after stirring for 20 minutes a fine dispersion of these bubbles in the polymer melt was achieved. Agitation was then stopped, the stirrer was removed, the polymer melt was allowed to stand for 2 minutes and the pressure was then reduced gradually during 10 minutes from atmospheric to 140 mm Hg to cause the polymer to foam. The foamed polymer was allowed to cool at this pressure until it solidified. A cylinder of tough, white, rigid foam was obtained with good texture and no voids; average density 0.22 g/cc.

The experiment described in the above example was repeated varying the amount of Lubrol MOA between 0.1 and 5 percent on the weight of nylon 6.6. In all cases there was some improvement in the quality of the foam but optimum results, as regards fineness of foam texture and stability against collapse, were obtained with Lubrol MOA concentrations of between 1 and 2 percent.

EXAMPLE 8 (comparative)

This describes a repetition of Example 7 omitting the surface active agent.

Nylon 6.6 granules (25 g) and water (0.5 ml) were placed in a long glass tube equipped with a stainless steel helical stirrer fitting closely in the tube. A current of nitrogen at a rate of 100 cm³/minute was passed through the apparatus in order to displace air and water vapor. The polymer was melted in one-half hour by heating the tube in a vapor bath at 280° C, after which the stirrer was started at a speed of 60 revolutions per minute. The helix of the stirrer forced small bubbles of gas into the polymer melt and after 15 minutes a dispersion of these bubbles in the polymer melt was achieved. Agitation was then stopped, the stirrer was removed, the polymer melt was allowed to stand for 2 minutes and the pressure was then reduced gradually during 8 minutes from atmospheric to 140 mm Hg to cause the polymer to foam. The foamed polymer was allowed to cool at this pressure until it solidified.

The foam obtained was very tough, but also very coarse with large voids; average density was 0.16 g/cc. The foamed polymer had a relative viscosity of 140 compared with the value for the starting material of 45.

EXAMPLE 9

The procedure of Example 7 was repeated, but 0.5 g of a condensate of cetyl alcohol with 2½ moles of ethylene oxide was included with the polymer granules at the start.

The foam obtained was very tough, having a less coarse structure with fewer voids than that from Example 7; average density was 0.17 g/cc. The foamed polymer had a relative viscosity of 103.

EXAMPLE 10

The procedure of Example 7 was repeated, but 0.5 g of a condensate of soya bean amine with 2 moles of ethylene oxide was included with the polymer granules at the start.

The foam obtained was tough but with a much finer and more even structure than when the surfactant was omitted; average density was 0.09 g/cc. The foamed polymer had a relative viscosity of 67.

EXAMPLE 11

The procedure of Example 7 was repeated, but 0.5 g of Silcocell 380 was included with the polymer granules at the start.

The foam obtained was very tough with average density 0.22 g/cc. The structure was only slightly better than in Example 7. The relative viscosity of the foamed polymer was 143.

EXAMPLE 12 (comparative)

The procedure of Example 7 was repeated, but 0.5 g of potassium stearate was included with the polymer granules at the start.

The foam obtained was coarse and uneven, average density was 0.31 g/cc. The relative viscosity of the foamed polymer was only 27. Despite its higher density the foam was much more brittle than the foams in Examples 2, 3 and 4 and could be broken easily by hand.

EXAMPLE 13 (comparative)

The procedure of Example 7 was repeated, but 0.5 g of disodium N-lauryl β-iminodipropionate was included with the polymer granules at the start.

The polymer mixture foamed on applying vacuum, but the melt viscosity was so low that the foam collapsed on cooling. The resulting polymer was extremely brittle and had a relative viscosity of only 8.

EXAMPLE 14

The procedure of Example 7 was repeated but 0.5 g of a condensate of octylphenol with 9 moles of ethylene oxide was included with the polymer granules at the start.

The foam obtained had a fine, even structure and an average density of 0.26 g/cc.

In a similar way nylon 12, nylon 6:10, nylon 6:iP and other nylons may be shown to produce good quality foams when an ethylene oxide condensate is used as surface active agent. When this surface active agent is omitted poor quality foams are produced.

EXAMPLE 15

Using a procedure similar to that described in Example 7, nylon 6 granules (25 g), and water (0.5 ml), together with 0.5 g of a condensate of tallow amine with 2 moles of ethylene oxide were heated in a vapor bath at 250° C until molten and stirred for 15 minutes under a current of nitrogen. After removal of the stirrer the pressure above the molten polymer was gradually reduced to cause it to foam. When the required foam density was achieved, heating was discontinued and the foam allowed to cool.

The foam obtained was tough and with a good even structure; average density was 0.52 g/cc.

In a repeat experiment in which the surfactant was omitted, the bubbles formed during the foaming process became so large that the foam stuucture was destroyed and the foam collapsed.

We claim:

1. A process for the manufacture of rigid polyamide foam which process comprises producing a foam of molten thermoplastic, linear polyamide of diamine and dicarboxylic acid or of amino acid or lactam, in the presence of a non-ionic surface active agent, and a blowing agent and then cooling below the melting point to solidify the polyamide, the amount of surface active agent being from 0.1 to 5 percent by weight of the polyamide.

2. Process according to claim 1 wherein the non-ionic surface active agent is an alkylene oxide condensate with an alkanol, alkylamine or alkylphenol containing 10 to 20 carbon atoms.

3. Process according to claim 2 wherein the condensate contains from 1 to 5 moles of alkylene oxide.

4. Process according to claim 2 wherein the non-ionic surface active agent is a condensate of cetyl alcohol with from 1 to 5 moles of ethylene oxide.

5. Process according to claim 2 wherein the surface active agent consists essentially of a condensate of cetylamine with from 1 to 5 moles of ethylene oxide.

6. Process according to claim 1 wherein the blowing agent is a depolymerizable polymer.

7. Process according to claim 1 wherein the polyamide is selected from the class consisting of homopolymers and copolymers of caprolactam and hexamethylenediamine adipate.

8. Process according to claim 1 wherein the polyamide is selected from the class consisting of homopolymers and copolymers of caprolactam and hexamethylenediamine adipate.

9. Process according to claim 8 wherein the depolymerizable polymer is one of which the monomers recombine to form the polymer on cooling again below the ceiling temperature.

10. Process according to claim 8 wherein the depolymerizable polymer is polymethylmethacrylate.

11. Process according to claim 8 wherein the surface active agent is a siloxane/alkylene oxide block copolymer.

12. Process according to claim 1 carried out in presence of a polymerization catalyst.

13. Process according to claim 12 wherein the polymerization catalyst is cyclohexylphosphonic acid.

14. Process according to claim 12 wherein the polyamide has a molecular weight of 1,000 to 5,000.

15. Process according to claim 1 carried out in presence of a cross linking agent for the polyamide.

16. Process according to claim 15 wherein the cross linking agent is the bishexamethylenetriamine/adipic acid 2:3 molar complex.

17. Process according to claim 1 wherein the cross linking agent is the hydroxyhexamethylenediamine/adipic acid 1:1 molar complex.

* * * * *

UNITED STATES PATENT OFFICE
CERTIFICATE OF CORRECTION

Patent No. 3,669,910     Dated June 13, 1972

Inventor(s) Geoffrey English et al.

It is certified that error appears in the above-identified patent and that said Letters Patent are hereby corrected as shown below:

Column 2, line 16, delete "blowing" and insert

-- surface active --.

Signed and sealed this 21st day of May 1974.

(SEAL)
Attest:

EDWARD M. FLETCHER, JR.       C. MARSHALL DANN
Attesting Officer              Commissioner of Patents

UNITED STATES PATENT OFFICE
CERTIFICATE OF CORRECTION

Patent No. 3,669,910          Dated February 22, 1971

Inventor(s) Geoffrey English et al.

It is certified that error appears in the above-identified patent and that said Letters Patent are hereby corrected as shown below:

On the cover sheet insert:

-- [30] Foreign Application Priority Data

June 9, 1976      Great Britain    26793/67 --.

Signed and Sealed this second Day of March 1976

[SEAL]

Attest:

RUTH C. MASON
*Attesting Officer*

C. MARSHALL DANN
*Commissioner of Patents and Trademarks*